MAGNETIC RECORDER HAVING BIAS AMPLITUDE VARIED AS A FUNCTION OF THE RECORDED SIGNAL

Filed March 9, 1964 2 Sheets-Sheet 1

BEVERLY R. GOOCH &
MAUNG GYI
INVENTORS

BY Stuart Lubitz
ATTORNEY

Feb. 6, 1968 B. R. GOOCH ET AL 3,368,032

MAGNETIC RECORDER HAVING BIAS AMPLITUDE VARIED AS A FUNCTION OF THE RECORDED SIGNAL

Filed March 9, 1964 2 Sheets-Sheet 2

BEVERLY R. GOOCH & MAUNG GYI
INVENTORS

BY Stuart Lubitz
ATTORNEY

United States Patent Office 3,368,032

Patented Feb. 6, 1968

3,368,032

MAGNETIC RECORDER HAVING BIAS AMPLITUDE VARIED AS A FUNCTION OF THE RECORDED SIGNAL

Beverley R. Gooch, Sunnyvale, and Maung Gyi, South San Francisco, Calif., assignors to Ampex Corporation, Redwood City, Calif., a corporation of California Filed Mar. 9, 1964, Ser. No. 350,482
8 Claims. (Cl. 178—6.6)

ABSTRACT OF THE DISCLOSURE

Apparatus for selectively changing the AC bias introduced to a video recording head, wherein the amplitude of the bias is increased during the presence of the video sync pulses to thus increase the magnitude of the magnetic signal applied to the recording medium during the sync pulses, and thus the magnitude of the sync pulses recorded on the medium.

A typical composite television or video signal is shown in FIGURE 1B. This signal comprises a video signal portion and the blanking signal portion which has a sync pulse that defines the well known front and back porch of the blanking signal. The sync pulse referred to is the horizontal sync pulse which maintains the synchronization between the video camera and the receiver deflection circuits. The sync pulses may be regarded as equivalent to a 15 kc. signal while the video signal may contain significant frequencies from 15 kilocycles per second to 1.5 megacycles per second or higher.

The AC bias technique is well known and is described in "Magnetic Recording Theory for Instrumentation," published by Ampex Corporation, 1963, pages 30–32. In the direct recording of television signals the AC bias is usually selected to maximize the recording of the highest frequency or the shortest wave length signal which may be a 1 (one) megacycle per second composite video signal. This technique achieves maximum bandwidth but it results in a reduced output at low frequencies and hence limits dynamic range.

If the composite video signal shown in FIGURE 1B was applied to a recording head with an AC bias that maximizes the recording of the video signal a recorded composite signal such as the one shown in FIGURE 1C would result. It can be seen that the relatively low frequency sync pulse recorded by this technique would be difficult to detect and synchronization would at best be unpredictable and unreliable.

In order to overcome the above mentioned shortcoming a bias apparatus and technique was conceived for maximizing the effectiveness of the recording of both the video signal and the low frequency horizontal sync pulse. This apparatus and technique employs a means for automatically and synchronously changing the amplitude of the AC bias signal when the sync pulse is to be recorded. The provision of this means for changing the amplitude of the bias signal results in the recorded composite video signal appearing as shown in FIGURE 1D.

The general object of this invention is to provide an improved apparatus and method for directly recording high and low frequency signals.

Another object of this invention is to provide an improved apparatus and method for directly recording composite video signals.

Another object of this invention is to provide an improved apparatus and method for recording composite video signals utilizing an AC bias arrangement.

Another object of this invention is to provide an improved apparatus and method for recording the relatively low frequency horizontal sync pulse of a composite video signal without compromising the recording of the high frequency video signal.

These and other objects of the invention will be readily understood when the detailed description is taken in conjunction with the drawings wherein.

Figures 1A, 1B, 1C, 1D:
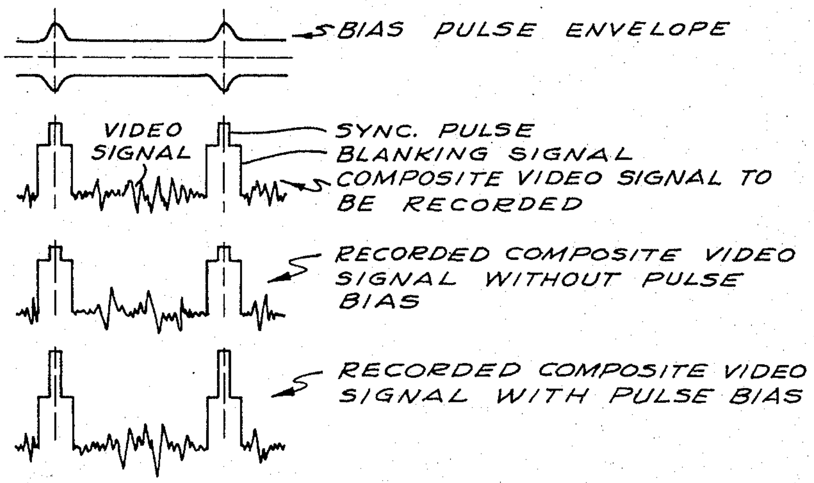
FIGURES 1A–1D are graphical showings of the composite video signals and their relationship to the pulse bias.
Figure 3:
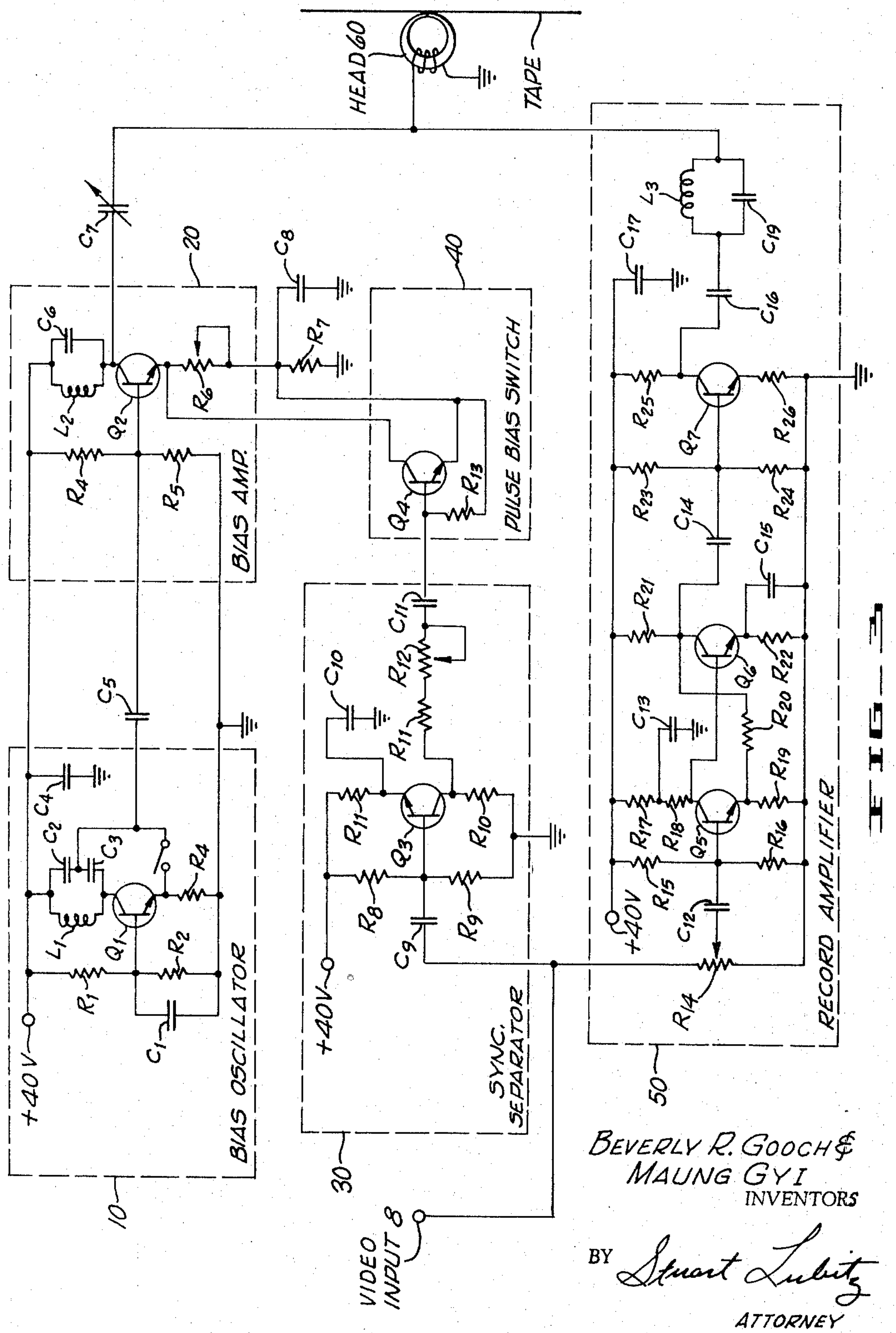
FIGURE 3 is a detailed circuit diagram that may be employed to accomplish the objects of the invention.

Referring to FIGURE 1, the improved recording apparatus comprises a bias oscillator 10 which is constructed to oscillate at a frequency such as 5–7 megacycles per second. The bias oscillator 10 may be any of the well known tube or solid state oscillators that are commonly employed in the electronic art with its frequency compatible with the highest frequency signal to be recorded. A typical solid state bias oscillator is shown in FIGURE 3 and may be constructed from components listed at the end of the specification.

Figure 2:
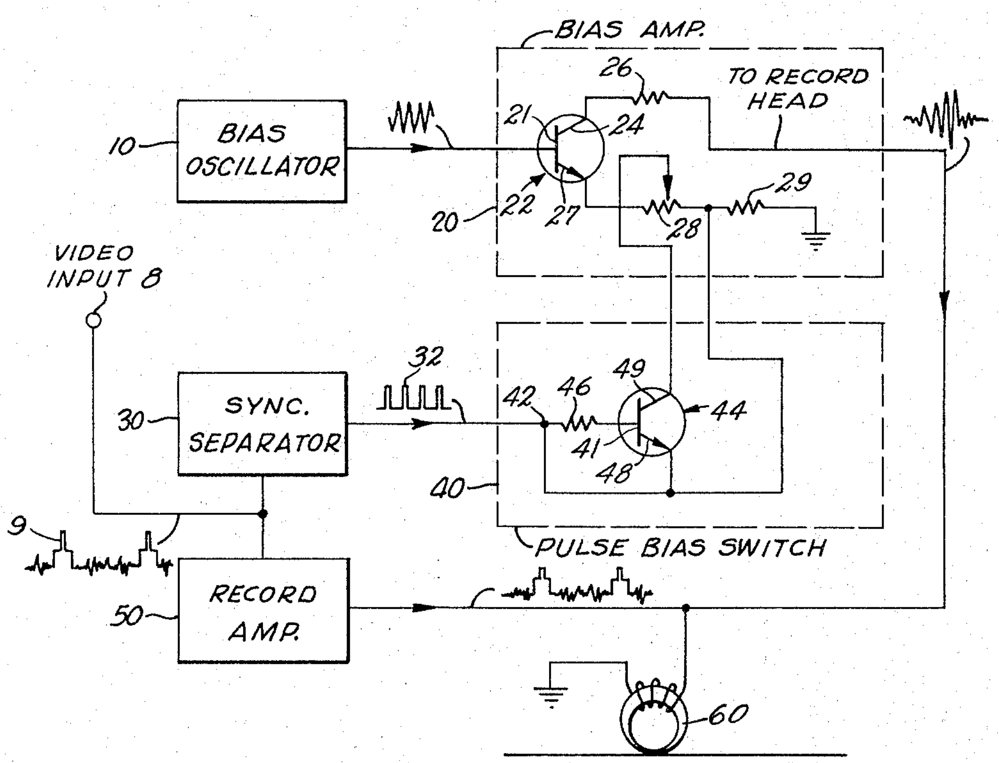
FIGURE 2 is a functional block diagram showing the significant aspects of the invention.

The output of the bias oscillator 10 is connected to a bias amplifier 20 which is shown in simplified form in FIGURE 2. The bias amplifier 20 may utilize tube or solid state components and functions as usual to amplify the amplitude of the input signals supplied by the bias oscillator 10. As shown schematically the bias amplifier includes an amplifying element 22 that takes the form of an NPN transistor. The transistor 22 has its base 21 connected to the bias oscillator 10 and its collector 24 connected to the recording head 60 via an impedance element such as resistor 26. The emitter 27 is ordinarily connected to ground by a pair of resistors 28 and 29 which in part control the amplitude of the output signal supplied by the bias amplifier 20 to the recording head 60. The resistor 28 is adjustable so that the bias amplifier output may be matched with the characteristics of the recording apparatus, recording medium and input signals and more particularly to optimize the bias at high frequencies.

A pulse bias switch 40 which normally may be considered open circuited or non-conductive is connected across the resistor 28. The pulse bias switch 40 has its input 42 connected to the signal or video input terminal 8 via a sync separator 30. A composite video signal such as one shown at 9 may be applied to the input terminal 8 and in turn to the sync separator 30. The sync separator 30 functions in the usual manner to pass or generate a signal so that a signal equivalent to the sync signal is supplied at its output. The sync separator 30 may be a tube type sync separator such as is shown on page 56 in the book "Color Television," published by the Electronic Education Unit of Philco Corporation, copyright in 1956 or it may take the form of an electrical or solid state means such as is shown in FIGURE 3. The sync separator 30 as shown in FIGURE 3 may be constructed from components which are listed at the end of the specification.

The output from the sync separator is shown at 32 and ideally takes the form of a rectangular pulse having a relatively short period. This pulse 32 is supplied to the input of the pulse bias switch 40 and is adapted to operate the pulse bias switch 40 so that it is no longer open circuited or non-conductive. The conduction or switching of the pulse bias switch 40 forms a short circuit around the resistor 28 for a period substantially controlled by the period of the pulse supplied by the sync separator 30.

As schematically shown in FIGURE 2 the pulse bias switch 40 comprises an NPN transistor 44 connected having its base 41 connected to the input 42 via resistor 46. The emitter 48 is connected to the input 42 and to one end of the resistor 28. The collector 49 is connected to the other end of the resistor 28. From a consideration of the above details of the pulse bias switch it can be seen that when the transistor 44 is non-conductive the resistor 28 will form an important part of the circuit connecting the emitter 27 to ground, but when the transistor 44 is conductive the resistor 28 will be substantially short circuited and form an insignificant part of the circuit connecting the emitter 27 to ground. The transistor 44 is made conductive by the pulse 32 supplied by the sync separator 30.

The final component of the improved recording apparatus is the record amplifier 50 which is directly connected to the video input terminal 8 and has its output connected to the recording head 60. The recording amplifier 50 may take the form of any of the well known amplifier structures used for this purpose. A typical amplifier is shown in FIGURE 3. The recording amplifier 50 amplifies and equalizes the video input signal 9 in accordance with the requirements of the recording head 60 and the requirements of the particular recording system.

In operation, the video input signal 9 is supplied to the video input terminal 8 and in turn to the sync separator 30 and the record amplifier 50. Meanwhile the bias oscillator 10 is operating at an amplitude selected to maximize the recording of the video signal portion of the composite signal. This amplitude may typically fall in the range of 25 volts peak to peak and 7 micro-seconds duration. It should be understood that the bias oscillator 10 has a selected frequency of oscillation which enables it to be linearly mixed with the video input signal and therefore results in negligible modulation. Eventually the sync portion of the composite video signal will be transmitted by the sync separator 30 to the pulse bias switch 40 to cause it to become conductive. The closing of the pulse bias switch 40 short circuits the resistor 28 and results in an increase in the amplitude of the bias signal supplied by the bias amplifier 20 to the recording head 60. This change in amplitude of the bias signal occurs automatically at the time when the sync pulse is being applied to the recording head and enables the sync pulse to be recorded without deterioration. As a matter of fact the recorded sync pulse receives a substantial emphasis and is actually an improved version of the sync pulse supplied to the input terminal 8. The improved recorded sync pulse is dramatically depicted by FIGURE 1D. A comparison of FIGURES 1C and 1D emphasizes the improved performance that is accomplished by this invention.

A particular embodiment of the disclosed invention is shown in FIGURE 3 as an electrical schematic diagram This figure, taken in conjunction with the previous description and components list that follows would enable anyone of ordinary skill in the art to construct and appreciate the invention. The components list is as follows:

| *Elements*: | | *Values of the elements* |
|---|---|---|
| R1 | ohms | 10K |
| R2 | do | 10K |
| C1 | picofarads | 10 |
| L1 | microhenries | 1.5 |
| C2 | picofarads | 510 |
| C3 | do | 750 |

| *Elements*: | | *Values of the elements* |
|---|---|---|
| C4 | microfarads | .1 |
| C5 | picofarads | 120 |
| R3 | ohms | 2.2K |
| Q1 | | 2N706A |
| R4 | ohms | 62K |
| R5 | do | 1K |
| L2 | microhenries | 3.3 |
| C6 | picofarads | 65–340 |
| C7 | do | 65–340 |
| Q2 | | CD38 |
| R6 | ohms | 500 |
| R7 | do | 100 |
| C8 | microfarads | 5 |
| R8 | ohms | 20K |
| R9 | do | 69K |
| R10 | do | 1.6K |
| R11 | do | 4.7K |
| Q3 | | 2N1309 |
| C9 | microfarads | 75 |
| C10 | do | 600 |
| R11 | ohms | 6.8K |
| R12 | do | 25K |
| C11 | microfarad | 1 |
| R13 | ohms | 1K |
| Q4 | | 2N706A |
| R14 | ohms | 75 |
| C12 | microfarads | 75 |
| R15 | ohms | 33K |
| R16 | do | 1K |
| Q5 | | 2N706A |
| R17 | ohms | 6.8K |
| R18 | do | 2.4K |
| R19 | do | 4.7K |
| R20 | do | 4.7K |
| C13 | microfarads | 75 |
| R21 | ohms | 1.1K |
| R22 | do | 750 |
| Q6 | | 2N706A |
| C14 | microfarads | 75 |
| C15 | do | 600 |
| R26 | ohms | 470 |
| R23 | do | 18K |
| R24 | do | 3.3K |
| Q7 | | 2N706A |
| R25 | ohm | 1K |
| C16 | microfarads | 100 |
| C17 | do | 100 |
| C18 | picofarads | 65–340 |
| L3 | microhenries | 6.6 |

The method of the invention is broadly the application of a first non-modulating bias signal to a recording head and then the application of a second such bias signal having an increased amplitude. The application of the second bias signal is for a short period coextensive with the appearance of relatively low frequency signals at the input terminal. This method is not an inherent function of the apparatus invention as it may be accomplished by manually operated means such as switches or by such non-equivalent means as a plurality of oscillators, switches and an oscilloscope or frequency meter.

While the above detailed description has shown, described and pointed out the fundamental novel features of the invention as applied to a preferred embodiment, it will be understood that various omissions and substitutions and changes in the form and details of the device and method illustrated may be made by those skilled in the art, without departing from the spirit of the invention. Such changes as combining the functions of the oscillator 10 and the amplifier 20 or eliminating the amplifier 20 or combining the record amplifier 50 and sync separator 30 into a single input means may be accomplished consistent with the broad aspects of the invention. It is the intention, therefore, to be limited only as indicated by the scope of the following claims.

What is claimed is:

1. In a recording apparatus the combination comprising:
recording medium;
recording head means for impressing signals on said recording medium;
bias oscillator means for applying an AC bias signal to said recording head means;
bias amplifier means for amplifying the output of said bias oscillator means and for applying said amplified output to said recording head means;
said bias amplifier means coupled to said recording head means and said bias oscillator means and constructed so that the magnitude of its output may be switched to one of a plurality of preselected values;
bias switch means for switching the output magnitude of said bias amplifier means from one value to another value at selected intervals;
said bias switch means operatively coupled to said bias amplifier means; and
record amplifier means for applying an input signal to said recording head means.

2. In a recording apparatus the combination comprising:
recording medium;
recording head means for impressing signals on said recording medium;
bias oscillator means for applying an AC bias signal to said recording head means;
bias amplifier means for amplifying the output of said bias oscillator means and for applying said amplified output to said recording head means;
said bias amplifier means coupled to said recording head means and said bias oscillator means and constructed so that the magnitude of its output may be switched to one of a plurality of preselected values;
bias switch means for switching the output magnitude of said bias amplifier means from one value to another value in response to the application of a given signal;
said bias switch means operatively coupled to said bias amplifier means; and
input means for applying an input signal to said recording head means and said bias switch means;
said input means coupled to said bias switch means and said head means, whereby the application of a given signal to the bias switch means by the input means results in the bias switch means altering the output magnitude of the amplifier means.

3. In a recording apparatus the combination comprising:
recording medium;
recording head means for impressing signals on said recording medium;
bias oscillator means for AC biasing said recording head means;
said bias oscillator means constructed so that the magnitude of its output may be changed;
said bias oscillator means coupled to said recording head means;
bias switch means for altering the output of said oscillator means to a selected one of the output magnitudes;
said bias switch means operatively coupled to said oscillator means; and
input means for applying an input signal including a given switch signal to said recording head means and said bias switch means;
said input means coupled to said bias switch means and said head means, whereby the application of the given switch signal to the bias switch means by the input means results in the bias switch means altering the output of the oscillator means to one of the output magnitudes.

4. In a recording apparatus, the combination comprising:
recording medium;
a recording head for impressing signals on said recording medium;
bias oscillator means for biasing said recording head;
bias amplifier means for amplifying the output of said bias oscillator means and for applying said amplified output to said recording head;
said bias amplifier means coupled to said recording head and said bias oscillator means and constructed so that the magnitude of its output may be switched to one of a plurality of preselected values;
bias switch means for switching the output magnitude of said bias amplifier means from one value to another value;
said bias switch means operatively coupled to said bias amplifier means;
record amplifier means coupled to said recording head for applying an input signal to said recording head; and
separator means for generating an output switch signal when said input signal to said record amplifier means is at a given frequency;
said output switch signal of said separator means connected to said bias switch means for enabling said bias switch means to switch the output magnitude of said bias amplifier means, whereby said bias applied to said recording head is changed to one of the preselected magnitudes when a given frequency input signal is applied to said record amplifier means.

5. The structure defined in claim 4 wherein the bias amplifier means includes an impedance element that may be substantially short circuited or substantially open circuited to change the value of the output magnitude of said amplifier means to one of the values; and said bias switch means is connected across said impedance element to open circuit or short circuit said element.

6. The structure defined in claim 5 wherein said bias switch means includes a solid state element connected across said impedance element and responsive to the output switch signal from the separator means.

7. In a recording apparatus for recording composite video signals, comprising a video signal and a sync signal, the combination comprising:
recording medium;
a recording head for impressing the composite video signals on said recording medium;
bias oscillator means for AC biasing said recording head at a frequency that does not modulate the composite video signals;
bias amplifier means for amplifying the output of said bias oscillator means and for applying said amplified output to said recording head;
said bias amplifier means constructed so that the magnitude of its output may be switched to one of a plurality of preselected values and connected to said bias oscillator;
pulse bias switch means for switching the output magnitude of said bias amplifier means from one value to another value;
said bias switch means operatively coupled to said bias amplifier means;
record amplifier means coupled to said recording head for applying the composite video signal to said recording head; and
sync separator means for transmitting an output switch signal when the sync signal is applied to said record amplifier means;
said output switch signal of said separator means connected to said pulse bias switch means for enabling said pulse bias switch means to switch the output magnitude of said bias amplifier means, whereby said AC bias applied to said recording head is changed to one of the preselected magnitudes when said sync signal is applied to said record amplifier means.

8. The method of magnetically recording composite signals on a recording medium with a magnetic transducer, said composite signals including a high frequency signal portion and a low frequency signal portion in time sequence, said method comprising the steps of transmitting a bias signal to said transducer that is adapted to maximize the recording effectiveness of the high frequency signal portion of said composite signals, transmitting the composite signal to said transducer, and changing the bias magnitude substantially simultaneously with the application of the low frequency portion of said composite signal to increase the magnitude of the low frequency portion of the recording.

References Cited

UNITED STATES PATENTS 3,180,929 4/1965 Hibbard ------------ 178—6.6

ROBERT L. GRIFFIN, *Primary Examiner.*

JOHN W. CALDWELL, *Examiner.*

H. W. BRITTON, *Assistant Examiner.*